April 16, 1968     R. J. V. HARMAND     3,378,032
SAFETY FLOW-LIMITING SELF-SERVOING PRESSURE
RELIEF VALVE, MORE PARTICULARLY FOR
DRAINING AND FILLING TANKS Filed Feb. 10, 1964     9 Sheets-Sheet 1

Inventor
Roger Joseph Victor Harmand
By Alvin Browdy
attorney

April 16, 1968

R. J. V. HARMAND 3,378,032

SAFETY FLOW-LIMITING SELF-SERVOING PRESSURE
RELIEF VALVE, MORE PARTICULARLY FOR
DRAINING AND FILLING TANKS

Filed Feb. 10, 1964

United States Patent Office 3,378,032
Patented Apr. 16, 1968

3,378,032
SAFETY FLOW-LIMITING SELF-SERVOING PRESSURE RELIEF VALVE, MORE PARTICULARLY FOR DRAINING AND FILLING TANKS
Roger Joseph Victor Harmand, 22 Rue de Lorraine, Paris 19eme, Seine, France
Filed Feb. 10, 1964, Ser. No. 343,812
Claims priority, application France, Feb. 5, 1963, 924,564
12 Claims. (Cl. 137—613)

ABSTRACT OF THE DISCLOSURE

A pressure reducing valve in which an atmosphere-vented expansion chamber includes opposed flexible walls forming common walls flanking high pressure and outlet pressure chambers including valve assemblies controlled by pressures exerted on the flexible walls.

---

This invention relates to a new safety flow-limiting pressure reducing valve and is more particularly, though not exclusively, applicable to a self-servoing pressure reducing valve usable as a cock on tanks containing fluid under pressure, and most notably on tanks or bottles containing gaseous fuel under pressure, as utilized chiefly for domestic purposes.

The subject valve of this invention is so devised and realized that it possesses important safety features ensuring, for instance, failure to turn on the rated utilization flow if the utilization circuit is not leakproof at least to within a preset leak flow and, conversely, reduction of the utilization flow to the preset leak flow as soon as occurs a leak or rupture in the lines leading to the utilization appliances.

A pressure reducing valve according to the invention includes a body adaptable to a tank and bounding an annular flange on both sides of which are mounted, on the one hand, a variable-capacity high pressure cell segregated from said flange by a deformable partition which regulates the primary pressure reduction sustained by the gaseous phase of a fluid under pressure contained in the tank, and, on the other hand, a variable-capacity low pressure cell connected to at least one consumption appliance and likewise segregated from said flange by a deformable partition adapted to absorb the secondary pressure-reduction variations sustained by the gaseous phase previously pressure-reduced in the high pressure cell, said deformable partitions jointly bounding with said annular flange, a capacity which is vented to the surrounding atmosphere whereby to absorb and compensate for movements of said deformable partitions.

One advantage of the subject valve of the present invention resides in the fact that the pressure reducing valve is devised and mounted in such manner as to forbid access to the pressure seals or stuffing-boxes operating under high pressure thereby considerably reducing the risk of accidents due to operators' inexperience.

Another advantage of the invention resides in the fact that the pressure reducing valve may also advantageously constitute an open and shut-off valve or tap the control of which is devised in such manner as to enable it to be remote-controlled whereby to increase the safety factor in the event of accidents.

Other objects and advantages are obvious or appear in part in the following detailed description with reference to the accompanying non-limitative exemplary drawings which give a clear understanding of how the invention can be carried into practice.

Referring to the first form of embodiment shown in the drawings, and more particularly in FIGS. 1 through 4, the pressure reducing safety valve 1 according to the invention is adapted to be mounted on the outlet connection 2 of an open and shut-off cock 3 fitted to a pressurized fluid tank 4 and more specifically to a bottle containing gaseous fuel under pressure, of the type used for domestic purposes.

Figure 2:
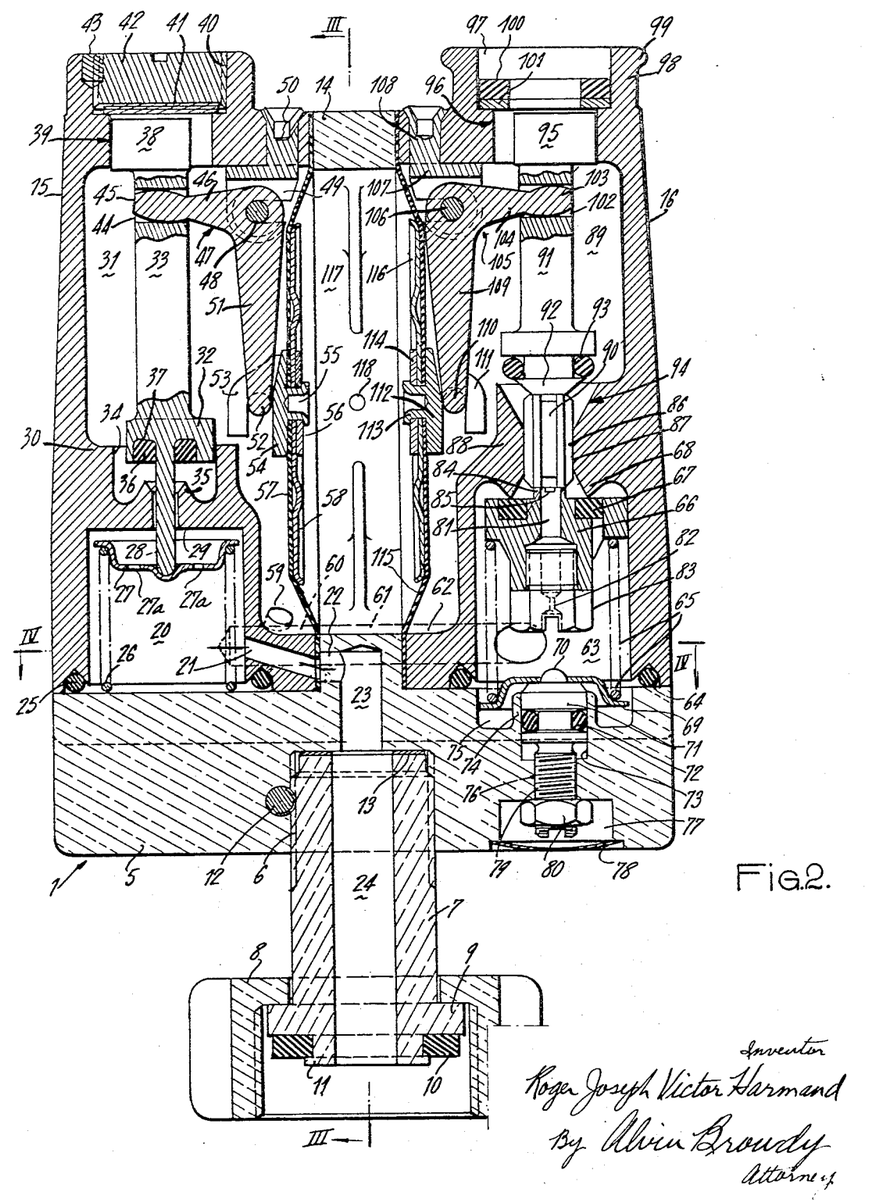
FIG. 2 shows in sectional elevation, on an enlarged scale, a pressure reducing valve according to this invention.
Figure 3:
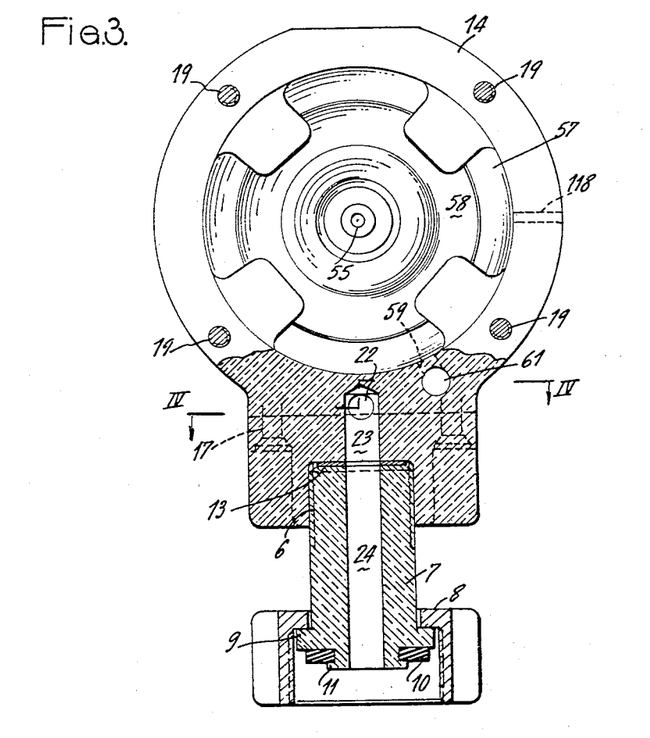
FIG. 3 is a cross-section on a smaller scale, taken through the line III—III in FIG. 2.
Figure 4:
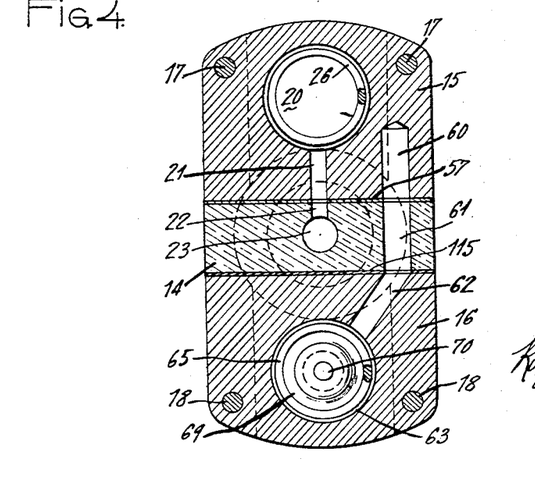
FIG. 4 is a section taken through the line IV—IV in FIG. 3.
Figure 5:
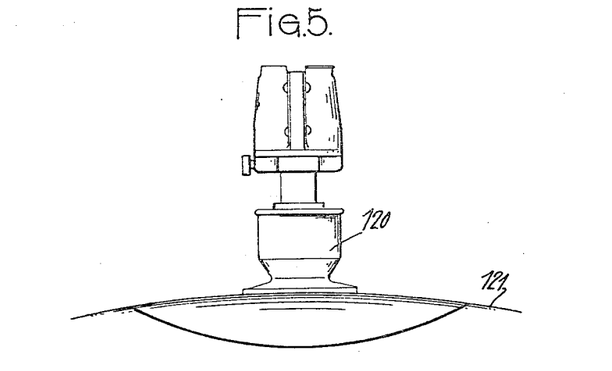
FIG. 5 shows in fragmental sectional elevation, on a smaller scale, the application of a second embodiment of the pressure reducing valve.

As is clearly shown in FIGS. 2 to 4, the pressure reducing safety valve includes a cruciform body 5 preferably made of brass or like material. The body 5 is provided from its lower face and in the middle thereof with a tapping 6 adapted to receive a hollow screw-threaded stem 7 over which is previously threaded a nut 8 whose sliding is limited by a flange 9 formed by the projecting terminal portion of stem 7. Flange 9 additionally constitutes a thrust surface for a seal 10 which is retained by a circular flange 11 formed by the end rim of said stem and which is preferably made of a material unaffected by the gas stored under pressure in tank 4. Seal 10 is designed to undergo moderate deformation when nut 8 is screwed home onto the cock connection 2, whereby the partial crushing of seal 10 ensures leakproof mounting of pressure reducing valve 1 on cock 3. Reference numeral 12 designates a locating dowel pin disposed between body 5 and hollow stem 7 for restraining the latter in a determined position wherein the tightening force applied to stem 7 compresses a seal 13 which provides leak-tightness between stem 7 and the bottom of tapping 6.

The upper face of body 5 presents in its middle part, perpendicularly to the longitudinal axis, an annular flange 14 which is flanked by two light alloy casings 15 and 16 rigidly connected to the body 5 by screws 17 and 18 and to the annular flange 14 by rivets 19, as is clearly shown in FIGS. 3 and 4.

The casing 15 (hereinafter referred to as "high pressure cell") bounds in its lower portion a high pressure chamber 20 communicating, through a passage 21 drilled obliquely through the base of the housing and through an orifice 22 provided transversely in the lower part of flange 14, with a hole 23 which opens coaxially with the tapping 6 into an extension of a central bore 24 which extends through the entire length of the stem 7.

The chamber 20, the tightness of which is insured by an O-ring 25 interposed between the upper face of body 5 and the base of casing 15, contains an elastic member 26 of the compression coil-spring type, the lower end of which bears against the upper face of body 5. This spring, which is adapted to provide a primary pressure relief of the fuel in gaseous phase contained in the tank or the bottle, bears at its upper end a cup 27 which is curved in its middle whereby to receive the extremity of a needle 28 extending through a bore 29 provided in a partition 30 which separates the high pressure chamber 20 from an intermediate chamber 31 formed in the upper portion of the high pressure cell 15. The needle 28 extends from the triangular bearing surface 32 of a high pressure valve 33 arranged vertically in the chamber 31, which bearing surface is guided through a cylindrical housing 34 which is provided in the partition 30 and whose end closure has an annular ridge 35 surrounding the bore 29, and constituting a seat with which cooperates a seal 36 made of a flexible and unalterable material accommodated in a groove 37 in the bearing surface 32 around the needle 28. The other extremity of valve 33 likewise presents a triangular bearing surface 38 which is similarly guided in a cylindrical housing drilled through the upper wall of casing 15 and opening into a machined orifice 40 which is closed by a seal 41 tightened down by a threaded plug 42 which is locked by a pin 43 disposed between the casing 15 and said plug 42.

Valve 33 is machined in such manner that it presents, near the bearing surface 38, a transverse port 44 into which engages a cam 45 formed on the end of the shorter arm 46 of a crank lever 47. Said lever is pivotally mounted about a pin 48 which is engaged into a yoke 49 rigidly connected to the upper wall of casing 15 through at least one end portion 50, which is partly tubular in order to enable it to undergo a riveting operation. The longer arm 51 of lever 47 is parallel with valve 33 and bears on its extremity, or has formed thereon, at least one peg 52 engaged into a yoke 53 whose base 54 is rigidly connected through the agency of a lug 55 riveted to a backing plate 56, with a flexible diaphragm 57 which is reinforced on its side opposite that bearing the base 54 by a shaped plate 58. Said diaphragm 57, which is preferably made of a material suited to the fluids involved, is clamped peripherally between the casing 15 and the annular flange 14, and forms a tight seal between these two elements and a deformable partition which segregates the high-pressure cell and in particular the intermediate chamber 31.

A hole 59 in the base or casing 15 communicates with a passage 60 drilled in said base so that to be disposed facing an orifice 61 which is provided transversely in the annular flange 14 and is extended by a bore 62 drilled through the base of casing 16, which casing will hereinafter be termed the "low pressure cell." Bore 62 opens into an intermediate chamber 63 which is bounded by the lower portion of cell 16 and which is rendered tight, in similar fashion to chamber 20, by an O-ring 64 interposed between the upper face of the body 5 and the base of the casing 16.

A compression coil spring 65 disposed in chamber 63 has at its upper end a servo-plug 66 fitted with an annular seal 67 made of flexible unalterable material and adapted to cooperate with a seat 68 formed by the upper wall bounding chamber 63. The lower extremity of spring 65 encircles a shaped cup 69 centered by a hemispherical protuberance 70 on the transverse wall of a cylindrical end-piece 71 bearing a sealing O-ring 72 thereon. This end-piece is disposed in a cylindrical housing 73 which, through an annular guiding rim 74, protrudes into the center of a likewise cylindrical recess 75 provided in the body 5 in an extension of intermediate chamber 63. A tapping 76 connects housing 73 to a cavity 77 machined into the bottom face of body 5 and adapted to be plugged by a cap 78. The latter is intended to prevent access to an adjustment screw 79 which extends from the end-piece 71 and cooperates with the tapping 76 so that the scaling of the coil spring be varied. Reference numeral 80 designates a nut for locking the screw 79 in a position wherein the scaling of the spring 65 corresponds to either the minimum or the maximum standard utilization pressure for a fuel gas, say 0.028 bar and 0.112 bar in the case of butane gas.

The triangular-shaped plug 66, guided by vertical walls of the intermediate chamber 63, has therein a central bore 81 whose section area may be controlled by a restrictor or jet 82 supported by a removable part 83 screwed to calibrate the orifice of the bore 81 opening into chamber 63. The other orifice of bore 81 is rimmed by an annular bearing surface 84 having therein recesses 85 whose function will be described hereinafter. A slide 86 bearing on the surface 84 is an easy fit in a passage 87 provided in a partition 88 bounding the wall of chamber 63, which passage places said chamber in communication with a low pressure chamber 89 formed at the top of cell 16.

The slide 86, which presents a peripheral cut 90 adapted to invariably register with the recesses 85 of flange 84, carries a low pressure valve 91 extending vertically into chamber 89. The end of this valve, which is in contact with slide 86, forms a frusto-conical bearing surface 92 equipped with an O-ring 93 which cooperates with a frusto-conical seat 94, which seat is machined concentrically with the passage 87 in partition 88, so that to open within the low pressure chamber 89. The other end of valve 91 forms, in like manner to the bearing surface 38 of high-pressure valve 33, a triangular bearing surface 95 guided in a cylindrical housing 96 extended by a bore 97 which is drilled in an end-portion 98 having a peripheral external ridge 99 for connection thereto of a union (not shown) forming part of a conduit or line leading to one or several consumption appliances. Reference numeral 100 designates a deformable annular seal supported by a thrust washer 101 and adapted to provide tightness when a male portion equipping the said union is engaged therein.

In like manner to the high pressure valve 33, the low pressure valve 91 presents, adjacent the bearing surface 95, a transverse port 102 into which engages a cam 103 formed by the extremity of the shorter arm 104 of a crank lever 105. Said lever is pivotally mounted on a fitted pin 106 which engages in a yoke 107 rigidly connected to the upper wall of casing 16 by a riveted lug 108. The longer arm 109 of lever 105 has on its extremity or formed thereon at least one peg 110 engaging into a yoke 111 whose base 112 is rigidly connected, through a lug 113, riveted to a backing plate 114, to a diaphragm 115. On its face opposite that bearing the base 112, said diaphragm is reinforced by a bulged plate 116. Diaphragm 115 is clamped peripherally between the annular flange 14 and the casing 16 and forms a leaktight seal between these two elements and furthermore constitutes, in like manner to diaphragm 57, a deformable partition which segregates the low pressure cell 16 and, in particular, the chamber 89 bounded thereby.

It should be noted that diaphragms 57 and 115 constitute, in conjunction with flange 14, a central capacity 117 (hereinafter termed "compensation and absorption chamber") which is invariably maintained at ambient pressure via a radial orifice 118 extending through flange 14.

Figure 1:
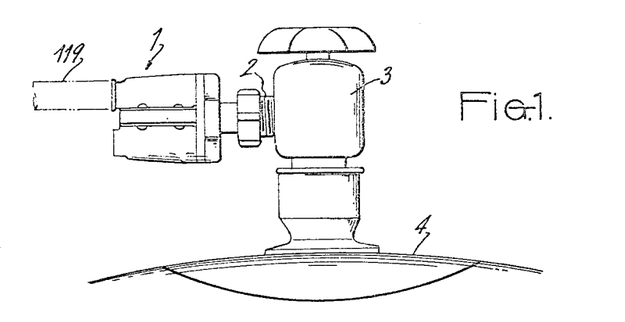
FIG. 1 shows in fragmental schematic elevation an example of utilization of the pressure reducing valve according to the invention.

As shown clearly in FIG. 1, the pressure reducing valve 1 is mounted on the outlet connection 2 of cock 3 whereby to deliver, through a connecting line 119 schematically represented in FIG. 1 by dot-dash lines, some gaseous fuel at controlled pressure and an output for supplying to gas appliances whose operation requires a gas input at one of the two standard pressures referred to in the foregoing example.

The example of operation described hereinbelow refers to a pressure reducing valve adjusted by the screw 79 whereby to provide pressure reduction of the gaseous fuel down to the minimum threshold of 0.028 bar. It will of course be manifest that the plug 66 which said valve includes is equipped with a removable part 83 having an appropriate restrictor corresponding to the setting of screw 79. Experiments have shown that for such adjustment it is preferable for the calibrated jet to have a section area of approximately three-tenths of a millimeter (0.0118 inch).

When the cock 3 is opened, the fuel under pressure in gaseous phase flows through the bore 24, the hole 23, the orifice 22 and the passage 21, into the high pressure chamber 20, and then escapes through the bore 29, since the high pressure valve is raised by the spring 26. The gas under pressure entering the intermediate chamber 31 produces a pressure rise therein which displaces the diaphragm 57 in the sense causing the volume of chamber 31 to increase. It should be noted that displacement of the diaphragm or membrane 57 produces no reaction on diaphragm 115 because the resulting compression effect on the air-cushion trapped between the diaphragms and the flange 14 causes a partial venting of the air through the orifice 118.

Through the agency of the yoke 53 and the peg or pegs 52, displacement of diaphragm 57 causes lever 47 to pivot about the pin 48 in the direction resulting in the arm 46 being lowered. As it moves, the latter draws with it the valve 33, thereby reducing the passageway between the seat 35 and the seal 36, and at the same time thrusting in the needle 28 by a maximum determinate amount corresponding to the calibration threshold of the spring 26, which threshold is such as to permit the valve 33 to lower and thereby to produce a primary pressure reduction in the gas—by way of—to the conduit 29 and the gap between the seat 35 and the seal 36 to approximately 0.200 bar in the above example.

It should be noted that, because the bearing surface 38 has a triangular section, the pressure prevailing in chamber 31 is applied equally in the cylindrical housing 39. The valve 33 has substantially instant response thereof to the smallest forces resulting from a displacement, in either direction, of the diaphragm in response to a drop or rise in the pressure prevailing in intermediate chamber 31.

This gaseous fuel pressure is transmitted through hole 59 of conduit 60, through orifice 61, and through bore 62, to the intermediate chamber 63, the plug 66 of which is thrust by the spring 65 against the seat 68. The gas under pressure, which is pressure-reduced in the foregoing example to 0.200 bar, is constrained to pass through the calibrated jet 82, the bore 81, the recesses 85, and the four peripheral cuts 90 in the slide 86, the cumulative sections of which allow, as a function of the pressure set by the first pressure reduction cell, a fluid through put into the low pressure chamber 89 only very slightly greater than the rated through put guaranteed and required for the utilization appliances anticipated. In the specific example hereinbefore described, it is assumed that said appliances are closed and that no leaks occur in the connecting tubes. As a result, a gas entering low pressure chamber 89 raises the pressure therein and consequently displaces diaphragm 115 in the direction causing the volume of said chamber to increase. This displacement caused by the small flow through the calibrated jet in turn causes, by a process similar to the one hereinbefore described, pivoting of lever 105 about pin 106. As the shorter arm 104 of lever 105 moves, its cam 103 lowers the low-pressure valve 91. This causes the seal 93 to move closer to the frusto-conical seat 94 and simultaneously displaces the slide 86, thereby thrusting the plug 66 against the force of the spring 65 and causing it to recede from seat 68.

The amount by which the valve 91, the slide 86 and the plug 66 are lowered is determined by the calibration of the spring, in such manner as to obtain, through the cut 90 and the space defined between the frusto-conical seat 94 and the seal 93, a second pressure reduction in the gaseous fuel down to a threshold figure of approximately 0.028 bar. This drop results in a larger throughput for use in the gas-consuming appliances, said throughput attaining as much as 1300 grams/hour in the example under consideration.

Should the output during utilization exceed the output of 1300 grams/hour considered in the foregoing example, it will readily be appreciated that the pressure prevailing in chamber 89 will drop suddenly and thereby cause the diaphragm 115 to move back and the lever 105 to pivot, causing the successive rising of valve 91, slide 86 and plug 66, under the urge of spring 65. When the plug 66 is applied back against the seat 68, the utilization output is cut off. In order to reach the chamber 63, the gas is constrained to flow through the restrictor 82, so that the small gas outflow absorbed by the leak cannot at any moment cause a new pressure rise in the chamber 89 and consequent lowering of the valve 91 followed by discharging of the gas under pressure at the high output rate.

The cock 3, which when opened results in the operations and pressure reductions hereinbefore described, may be accidentally opened when the consumption appliances have been left turned on after use or when a leak in the supply circuit to the appliances occurs. When this is the case, the gas reaching the chamber 89 through the jet 82 causes no pressure rise because the orifices of the appliances, which are normally designed to permit combustion of the gas through the necessary make-up air, are so calibrated that their output is greater than that of the jet 82, whereby he output delivered by jet 82 is totally absorbed by said orifices. This likewise applies if gas leaks from the supply circuit to the appliances at a rate greater than the rate controlled by the jet 82. If a user wishes to supply gas appliances requiring a higher pressure at the maximum standardized threshold of 0.112 bar, corresponding to an approximate output of 2600 grams/hour, he will replace the pressure reducing valve hereinbefore described by a similar valve which has been preadjusted by means of the screw 79 to apply a greater loading force on the spring 65 in order that maximum compression thereof should determine a given amount of downward travel of the valve, which valve then sets a degree of spacing between the seal and the seat 94 which ensures, firstly, a secondary pressure reduction in the gas to a threshold of approximately 0.112 bar, and, secondly, a higher output thereof corresponding substantially, at that pressure, to 2600 grams/hour.

An alternative form of embodiment of the pressure reducing valve of the invention is shown in FIGS. 5 through 9, in which like parts to those described precedingly are designated by like numerals.

Figure 6:
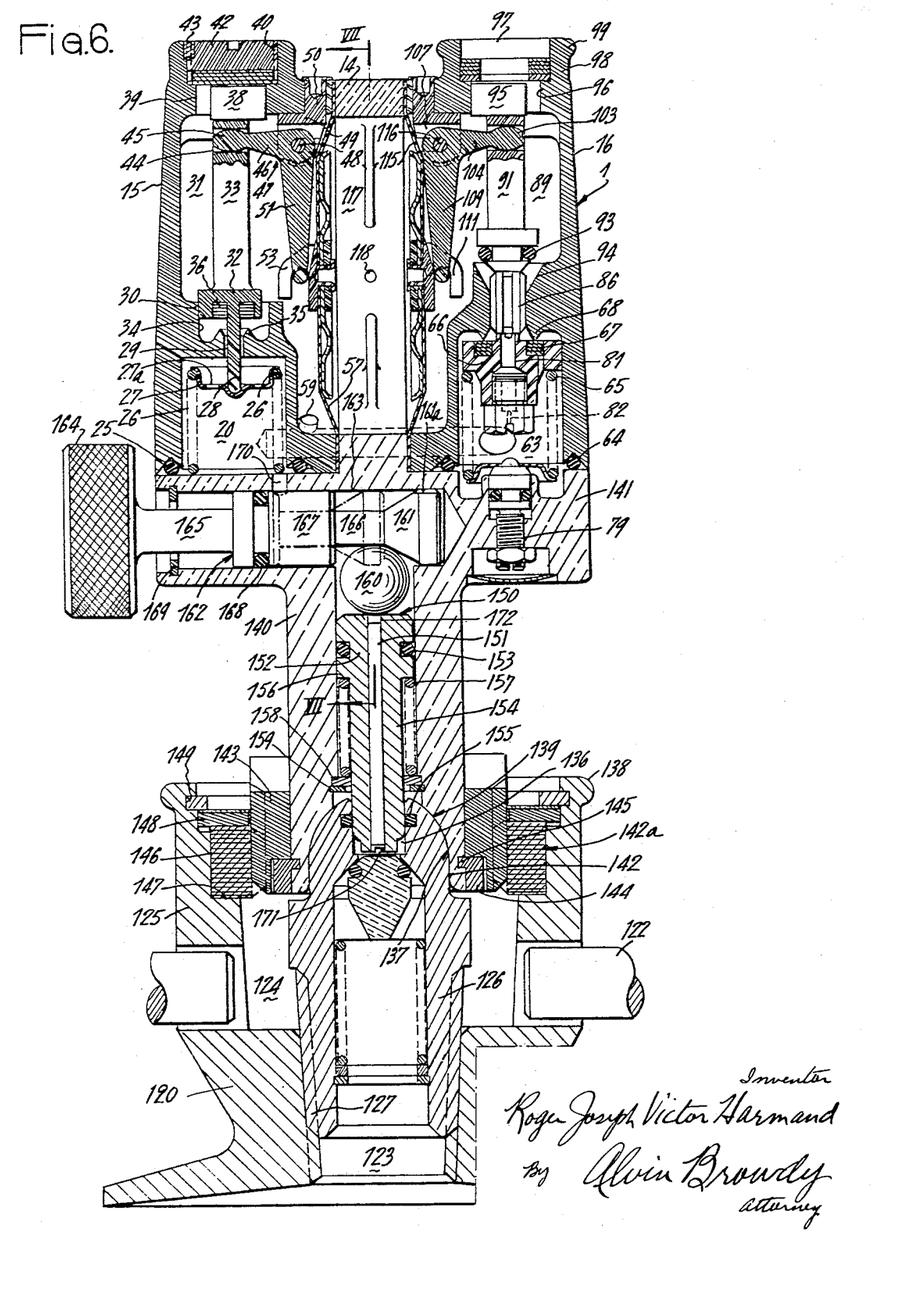
FIG. 6 is a sectional elevation on an enlarged scale of the embodiment of FIG. 5.

In this specific form of construction, the valve is designed to be fitted directly to the neck 120 of a bottle or tank 121, in such manner as to constitute both pressure reducing safety valve and a control means of the opening and shutting of the sealing member of a tank containing fluid under pressure, and in particular of a bottle containing such fluid.

As is clearly shown in FIG. 6, the neck 120, to which may be fitted a pivoting grip shown partly at 122, has therein a conical tapping 123 which opens into the centre of a cylindrical housing 124 bounded by an annular envelope 125 which forms the upper terminal portion of neck 120. Housing 124 is adapted to receive a valve body 126 of any convenient design, and more particularly a valve for connection to a tank containing fluid under pressure, more particularly fuel gas.

In the manner well known per se, the upper end of said valve 126 forms a dome 137 adapted to cooperate whereby to form a high pressure hemispherical joint with a cavity 139 of matching curvature machined into a tubular end portion 140 extending from the bottom face of the body 141 forming part of the pressure reducing valve 1. Said end portion 140 is guided in a cylindrical bearing surface 142 forming an extension of the dome 137 and is provided externally with a screw 143 whose longitudinal travel is limited by a retaining collar 144 rigidly connected to the bottom end of the tubular end-portion 140 through an internal annular ridge 145 on said collar. The screw 143 screws into a polygonal nut having a determinate coefficient of friction and which is inserted with a determined degree of side clearance into a polygonal housing 124, against a shoulder 147 formed on said housing. A packing washer 148 and a keeper ring 149 mounted in a groove provided adjacent the upper peripheral edge 138 limit the degree of vertical travel of said polygonal nut 146.

The tubular end-portion 140 is adapted to receive a push-rod 150 having a central bore 151 therein. Said end-portion is cut in such manner as to form a head 152 equipped with a sealing O-ring 153 and a stem 154 engaged into a cylindrical hole 136 which is itself provided with an O-ring 155 in order to improve tightness. The annular ridge 156 formed at the point where the head 152 merges with stem 154 acts as a thrust face for the upper extremity of a compression coil spring 157 which is threaded over the stem 154 and has its bottom extremity restrained in such manner that it be kept compressed by a thrust washer 158 which is located by a keeper-ring 159 engaged into a groove in the inner peripheral wall of said tubular end-portion 140. Said spring is used to maintain the upper face of head or piston 152 in pressure contact with a ball 160, whereby to press the latter against the actuating piston 161 of a slide-valve 162. The latter is housed in a cylinder 163 formed within the relief valve body 141, so that an operating knob 164 connected to the slide-valve 162 by a shaft 165 protrudes at right angles to the tubular end-portion 140, coaxially with one of the branches of the body 141 extending transversely with respect to the annular flange 14.

The cylindro-frusto-conical operating piston 161 has therein a cut 161a for enabling the fluid under pressure to flow into that part of the cylinder which extends beyond the bore defined by the tubular end-portion, whereby to ensure balancing of the slide valve. Said piston 161 has extending from its smaller base a cylindrical rod 166 which connects it to a sealing piston 167 provided with an O-ring seal 168 and from which extends the shaft 165. Reference numeral 169 designates a keeper-ring forming an abutment whose function is to limit the degree of sliding motion of the slide-valve when the same is moved from one position (shown in solid lines in the drawings) wherein control piston 161 is disposed in that part of the cylinder which extends beyond the bore defining the tubular end-portion 140, to another position (shown in dot-dash lines) wherein the sealing piston uncovers a hole 170 drilled into the body 141 in a radial direction relative to cylinder 163, whereby to cause said cylinder to communicate with the high-pressure chamber 20 defined by the upper portion of the reducing-valve high-pressure cell 15.

It is easy to understand that when the operating knob is pulled in order to move the slide-valve 162 into the position shown in dot-dash lines wherein hole 170 is uncovered, this results, through the agency of the sloping ramp defined by piston 161, in the ball 160 and hence the push-rod 150 being thrust inwardly against the force of the coil spring 157. The extremity of stem 154, being engaged in the cylindrical hole 136, causes a valve disposed in the body 126 to be lowered. The result of this is to leave a free passage for the gaseous phase of the pressurized fuel contained in the bottle. This gaseous phase is constrained to flow through a cut 171 made in the bottom end of the stem, then through bore 151, to finally open through a cut 172 in the upper face of piston 152 into the cylinder 163, following which the gaseous phase flows through the hole 170 in chamber 20 and then undergoes, as explained precedingly with reference to the example chosen in the first form of embodiment hereinbefore described, a first pressure reduction to approximately 0.200 bar. As in the previous case, the gaseous phase is then directed towards the intermediate chamber 63 to undergo a second pressure reduction to 0.028 or 0.112 bar, depending on the adjustment of the screw 79 and the specific applications anticipated.

As in the case of the pressure reducing valve described above, the utilization pressure is adjusted at the time of manufacture and assembly of the component parts of the valve. In consequence, a user disposing of appliances operating at the pressures standardized or specified by the maker, must thus possess differently adjusted pressure reducing valves which he is able to adapt alternatively to a same tank or bottle containing fuel gas.

One of the advantages of the embodiment described hereinabove resides in the fact that mounting of the pressure reducing valve on the neck 120 dispenses with the need for the customary seal made of flexible material which, through being incorrectly tightened down—if not actually crushed completely and destroyed—is frequently the cause of serious accidents. A further advantage of the open and shut-off control device resides in the design of the hand-operated slide-valve sometimes referred to as "first blow," which permits rapid shutting off in the event of an accident, and even with aid of a convenient object such as a broom handle or the like, without approaching the tank or bottle.

In addition, the hemispherical cavity machined into the tubular end-portion 140, and the dome 137 of the valve body 126, provide good leak-tightness at the assembly, this being further enhanced by the O-ring 155 surrounding the push-rod stem 154. Indeed, cavity 139 and dome 137 are so devised and disposed that their surfaces are in no danger of being at least partly damaged by impacts or knocks from metal elements or components which could be detrimental to the condition and polish of the surfaces to cooperate.

Figures 7, 8, 9:
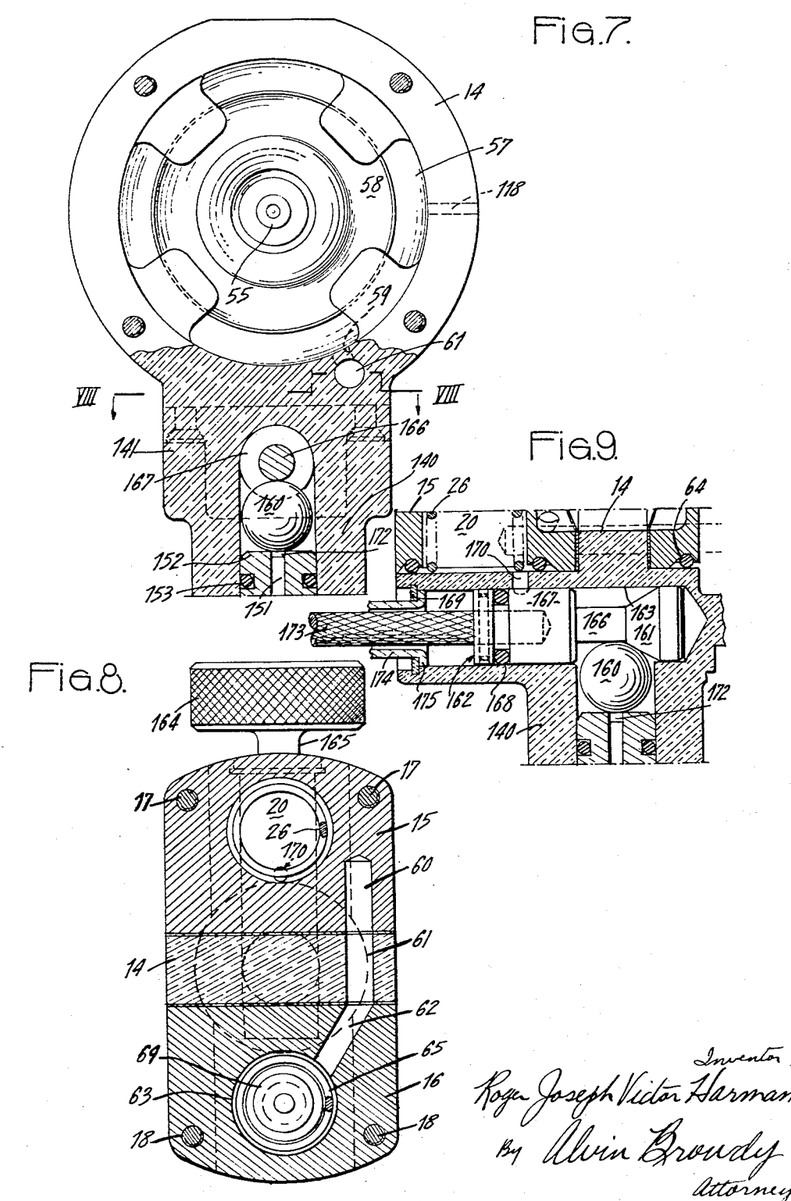
FIG. 7 is a cross-section taken through the line VII—VII in FIG. 6.
FIG. 8 is a section taken through the line VIII—VIII of FIG. 7.
FIG. 9 is a fragmental section showing an alternative embodiment of one of the component parts of the pressure reducing valve.
Figure 10:
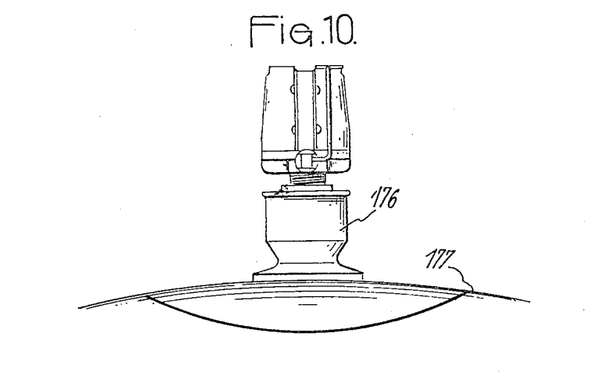
FIG. 10 shows in sectional elevation, on a smaller scale, the application of a third embodiment of the pressure reducing valve according to the invention.

FIG. 9 shows an alternative partial embodiment of the pressure reducing valve 1 hereinbefore described, wherein operation of the slide-valve 162 is effected differently with a view to increasing both the safety factor (particularly in the event of a malfunction) and the ease of opening and shutting off manipulations of the fluid circuit. In this form of construction, the slide-valve 162 is remotely operated by a flexible cable 173 of which one extremity (not shown) is equipped with a suitable actuating member and the other extremity, which is guided through a protective tube or flexible sheath 174 and has a turned down edge 175 retained by the keeper-ring 169, is rigidly connected by an convenient means to the sealing piston 167.

Yet another alternative form of construction is shown in FIGS. 10 through 14, wherein the pressure reducing valve, likewise constituting an open and shut-off cock, is permanently mounted on the neck 176 of a fuel gas bottle or tank 177. In this form of construction, the pressure reducing valve is also designed to permit filling operations, and to supply gas, according to the consumption appliances utilized, at a pressure which, in the specific example considered hereinabove, is equal to 0.028 bar or 0.112 bar. As before, like component parts to those described in the preceding embodiments are designated by the same reference numerals.

Figure 11:
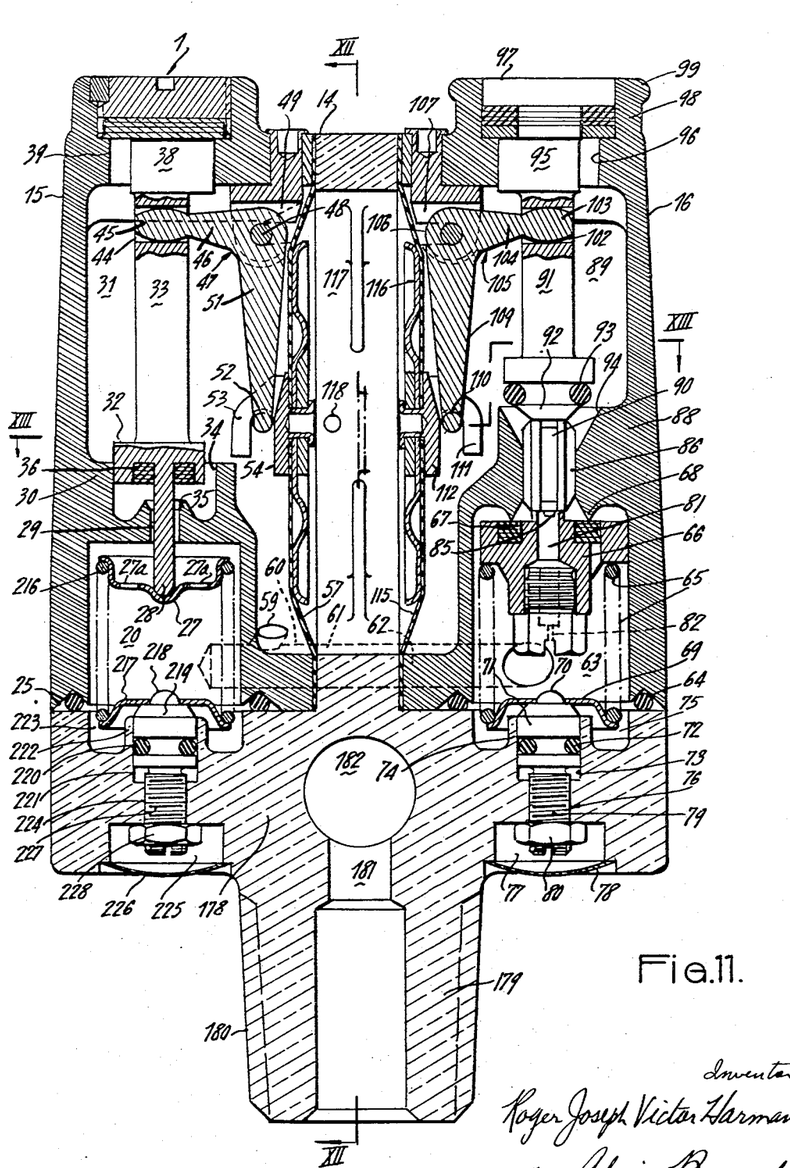
FIG. 11 shows in sectional elevation, on an enlarged scale, the pressure reducing valve of the embodiment of FIG. 10.
Figure 12:
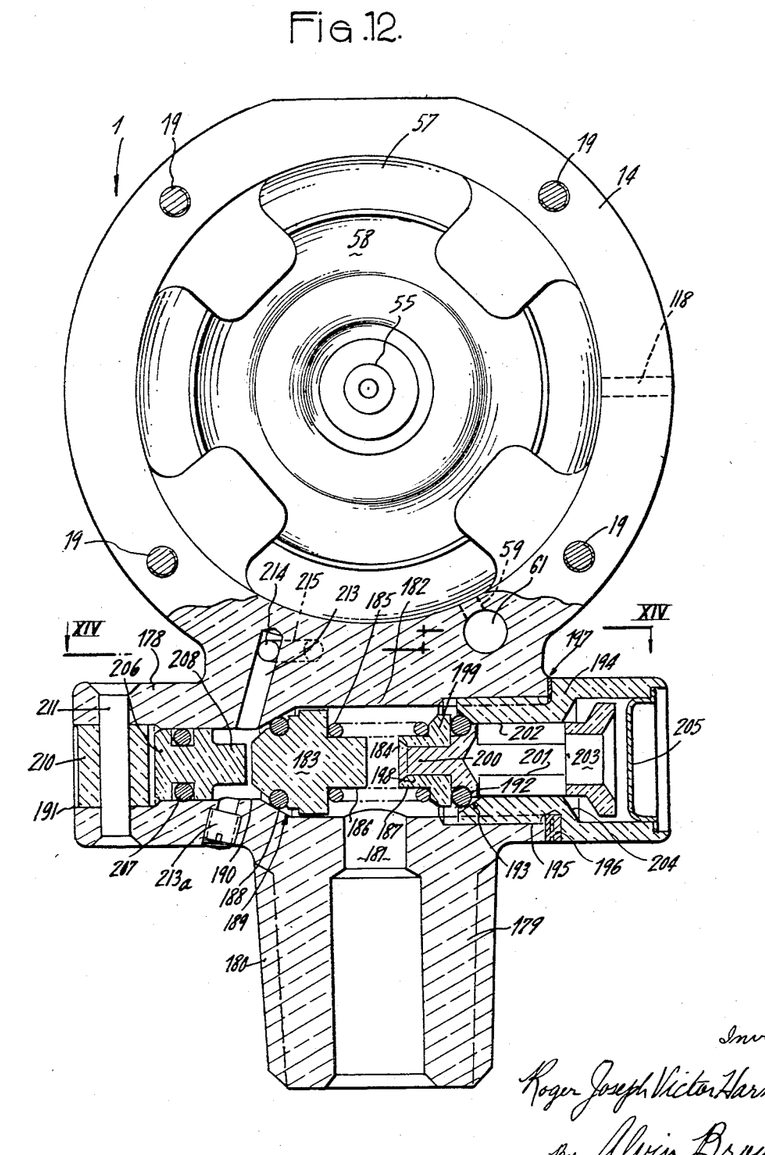
FIG. 12 is a cross-section taken through the line XII—XII in FIG. 11.

Referring to FIGS. 11 and 12, the pressure reducing valve 1 shown thereon comprises a cruciform body 178, from the lower face of which projects a tubular end-piece 179 having a conical externally threaded portion 180 adapted to permit the leaktight mounting of said valve on the tank or bottle neck. Said end-piece 179 communicates through an internal hole 181 with a cylinder 182 disposed perpendicularly, along the axis of one of the branches of the body 178. This cylinder contains a movable compound comprising two valves 183 and 184 which are maintained in mutually opposed and spaced relation by a compression coil spring 185 interposed therebetween and threaded over facing journals 186 and 187 formed by the two valves. An O-ring 188 is engaged into a peripheral groove in the frusto-conical portion of valve 183. Said spring is adapted to apply O-ring 188 against a conical seat 189 formed where the cylinder 182 merges with a bore 190 which extends said cylinder and opens from the lateral wall 191 of body 178. An additional effect of spring 185 is to apply a seal 192 mounted on piston 184 against a conical seat 193 formed at the end of a sleeve 194 which is partly externally threaded and which is screwed into a tapping 195 in the cylinder 182, wherein it is locked by a dowel pin 196. Reference numeral 197 designates a sealing joint tightened between a shoulder on the sleeve 194 and the body 178.

Valve 184, which consists of a ring 198 having thereon a flange 199 threaded over a core 200, is connected through small bars 201 extending through the bore 202 of the sleeve 194, to a tubular valve 203 adapted to co-operate with a conical seat 204 formed on the interior of the sleeve. Reference numeral 205 designates a plug designed to obturate the internal passage of sleeve 194 whereby to prevent users from having access thereto.

Bore 190 extending the cylinder 182 includes a push-rod 206 equipped with a seal 207 and having thereon a projecting finger 208 susceptible of being moved into contact with valve 183 under the action of the lobe 209 of a cam 210 which is pivotally mounted in the horizontal plane about a pin 211 rigid with the body 178. As is clearly shown in FIG. 14, cam 210 is extended externally by a crank lever 212 for actuating the same.

A duct 213, which is drilled obliquely from the lower face of body 178, over the boundary zone separating cylinder 182 from bore 190, and which is obturated by a plug 213a, communicates with a passage 214 in the annular flange 14. This passage is extended by a duct 215 drilled obliquely through the casing 15 whereby to give open into the high-pressure chamber 20 bounded defined at the lower portion of said casing.

In this specific embodiment, the chamber 20 encloses a compression coil spring 216 whose upper end supports the cup 27, in like manner to the spring described precedingly. The lower end of spring 216 is threaded over a cup 217 which is centered by a protuberance 218 on the upper wall of a cylindrical end-piece 219 carrying a seal 220. Said end-piece is disposed in a housing 221 which, by an annular guide rim 222 projects into the center of a recess 223 provided in the body 178, extending the chamber 20. A tapping 224 connects housing 221 with a cavity 225 machined into the lower face of body 178 and adapted to be plugged by a capsule 226. The latter constitutes a protective surface preventing access to an adjustment screw 227 which extends the end-piece 219 and cooperates with the tapping 224 in such manner that rotation thereof causes the cup 217 to be displaced vertically, thereby enabling the spring 216 to be adjustably loaded. Numeral 228 denotes a nut for locking screw 227 in a position wherein spring 216 is set to initially reduce the gaseous phase of the pressurized fuel in the tank or bottle to a threshold pressure substantially equal to the maximum desired pressure, namely 0.112 bar in the specific example considered.

In like manner to the embodiments described precedingly, the pressure reducing valve includes also in the chamber 63 the spring 65 whose setting is adjusted by the screw 79 in such manner as to produce in the low pressure chamber 89 a second pressure reduction of the gaseous phase to 0.028 bar.

Figures 11A, 14:
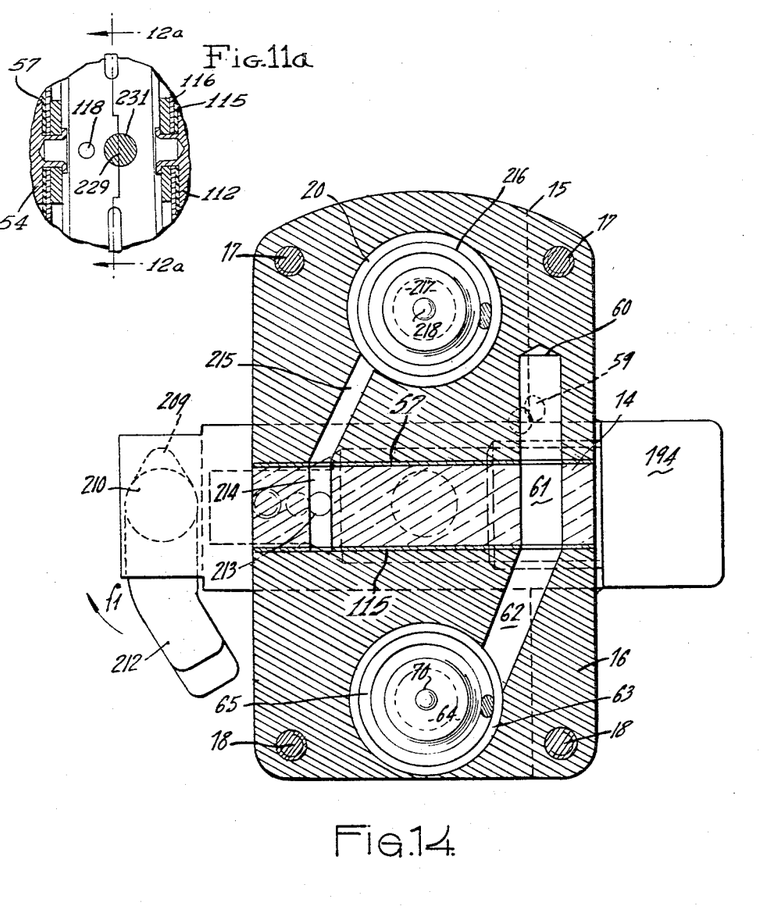
FIG. 11a is a fragmentary sectional view taken substantially on the plane of line 11a—11a of FIG. 12a, and is similar to the corresponding portion of FIG. 11.
FIG. 14 is a section taken through the line XIV—XIV in FIG. 12.

A rotation of the control lever 212 through an angle of 90° in the direction of the arrow $f_1$ actuates the cam 210 to move the lobe 209 thereof into alignment with push-rod 206 and valve 185, thereby causing said push-rod and said valve to slide against the action of spring 185. This sliding motion, which results in the seal 192 of valve 184 being more firmly applied against the seat 193, additionally causes the seal 188 to recede from the seat 189, thereby opening up a passaage for the gaseous phase of the fuel under pressure contained in the bottle. This gaseous phase flows through the duct 213, the passage 214 and the passage 215, into the high-pressure chamber 20.

The manner of operation of the high-pressure cell 15 of this pressure reducing valve is similar to that of the embodiments described precedingly, in consequence whereof, subsequent to opening of the cock comprising valve 183, push-rod 206, and cam 210, the pressure of the gaseous phase is reduced in the intermediate chamber 31 to a value corresponding to the spring setting, i.e. to 0.112 bar in the present example. This gaseous phase is then conveyed through hole 59, passage 60, orifice 61 and the bore 62, into the intermediate chamber 63 of low-pressure cell 16, in which it flows through the jet 82 communicating with the low-pressure chamber 89.

The setting under pressure of chamber 89 causes a displacement of the diaphragm 115 which, through the medium of crank lever 105, controls downward movement of low-pressure valve 91 and the moving of O-ring 93 towards seat 94. Through the agency of slide 86, this downward movement causes a similar downward movement of the plug 66, which then lifts off the seat 68 and thereby permits a larger output of gas which has been reduced to the desired pressure by its flowing through the annular space between seal 93 and seat 94, the cross-section of which space is a function of the degree of downward movement of valve 91, which is in turn determined by the setting of spring 65.

Figure 12A:
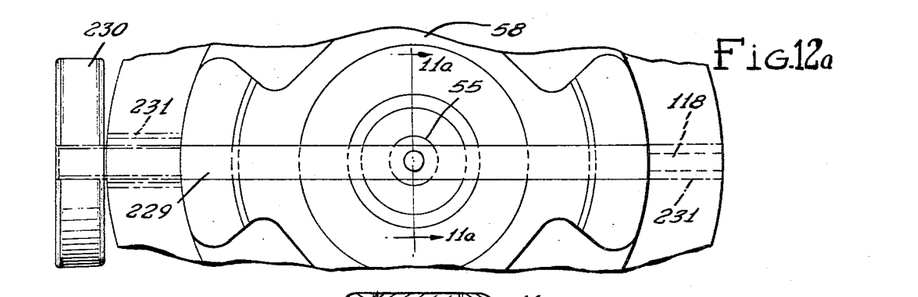
FIG. 12a is a fragmentary sectional view taken substantially on the plane of line 12a—12a of FIG. 11a, and substantially similar to the corresponding portion of FIG. 12.
Figure 13:
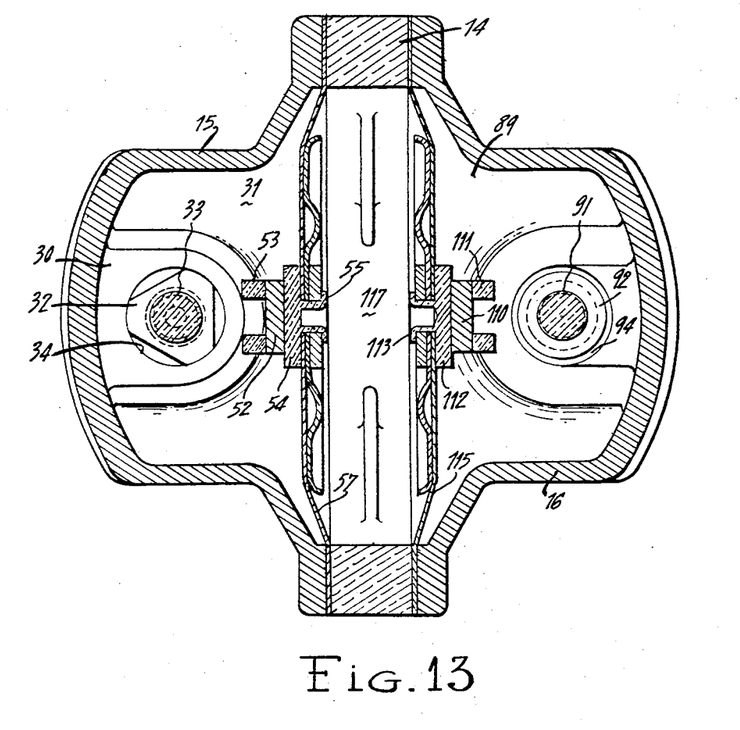
FIG. 13 is a section taken through the line XIII—XIII in FIG. 11.

Referring to FIGS. 11a and 12a, which comprise a slight modification of FIGS. 11 and 12, should the user wish to supply gas appliances with a gas fuel, and more specifically with a butane gas whose pressure has been reduced to the maximum standard pressure, i.e. 0.112 bar, he may fit the pressure reducing valve hereinbefore described in FIGS. 11 and 12, with a rod 229 shown in FIG. 12a. This rod extends from a knob 230, by means of which it can be threaded through two diametrically opposed holes 231 (see FIG. 11a) which are drilled through the annular flange 14 in such manner as to be offset by a determinate amount with respect to the transverse center plane toward the diaphragm 115 obturating the low-pressure cell 16. It will be noted in FIG. 11 that orifice 118 is slightly offset with respect to the center plane of flange 14 to permit the just-mentioned modification. Thus, when said diaphragm is displaced as the result of chamber 89 being set under pressure, rod 229 acts as a displacement limiter against which the plate 116 butts, thereby restricting the displacement of diaphragm 115.

The result of this is to correspondingly reduce the downward movement of low-pressure valve 91 and consequently to provide between seal 93 and seat 94 a larger annular space through which the gaseous phase issuing from the chamber 63, after the valve 66 moves downwardly, can escape without virtually undergoing a second pressure reduction. The annular space provided in this way also permits a larger gas throughput, corresponding to the pressure used.

In addition to its dual application possibilities, the pressure reducing valve hereinbefore described has the same functional characteristics and safety features as those described with reference to FIGS. 1 through 9. Furthermore, the special design of the various valves housed in the cylinder provided in the body 178 makes possible the filling operations of the tank or bottle to which the pressure reducing valve of this invention is fitted. Indeed, this can be accomplished by removing the protective cap 205 and so connecting any pipe connected to the filling means that an element on the pipe termination thrusts the valve 203 inwardly, thereby causing valve 184 to be likewise thrust inwardly against the action of spring 185, the result of which is to apply the seal 188 of valve 183 more firmly against the seat 189. When the seal 192 lifts from the seat 193, a passageway is thus provided for communication with the interior of the tank or bottle, whereby the same can be evacuated and filled with fuel under pressure in liquid phase without any danger of the latter penetrating into the pressure reducing valve. Manifestly, removal of the filling pipe termination will cause valve 184 and valve 203 to revert to their initial positions under the urge of spring 185, thereby ensuring perfect leaktightness. The lever 212 can then be moved to operatively actuate the cam 210, whereby to subject the fuel escaping in gaseous phase to the pressure reductions enabling it to be used in the gas appliances.

It should also be noted that a further advantage of control lever 212 is that the bottle can be shut off by moving said lever in either direction from its original position, in which the lobe 209, acting through the push rod 206, opens the valve 183. This is a significant safety feature of the pressure reducing valve of this invention, particularly in an emergency when the bottle must be shut off subsequent to a mishap which may prevent the user from moving close to the bottle.

It should be noted that the special design of the various pressure reducing valves described hereinabove has the advantage of screening all the high pressure seals, thus making the latter inaccessible to operators. In addition, these pressure reducing valves are designed so compactly that they can be toally enclosed and protected by a cap of the type normally fitted to pressurized gas fuel tanks and more particularly to domestic-type gas bottles.

It goes without saying that the nature of the pressurized fluids and the pressure and output figures referred to hereinabove are given by way of example only in order to clarify the description, the manner of operation and the safety features of each specific form of embodiment.

It is, therefore, to be understood that the descriptions hereinbefore set forth are not to be considered as limitations of the invention, but that changes may be made within the spirit and scope of the invention as set forth in the appended claims.

I claim:
1. A pressure reducing valve comprising
   a body including an expansion chamber including means for venting said chamber to the atmosphere, first and second flexible partitions forming opposite sides of said expansion chamber, said body including an inlet chamber underlying a first intermediate chamber, said first flexible partition defining a lateral wall portion of said first intermediate chamber, high pressure inlet means for connecting said inlet chamber to a high fluid pressure source,
   a partition separating said inlet and first intermediate chambers, said partition including a bore connecting said inlet and first intermediate chambers and including a valve seat surrounding one end of said bore in said first intermediate chamber,
   cylindrical guide surfaces in spaced relation at opposite ends of said first intermediate chamber,
   a first valve element in said first intermediate chamber and including spaced triangular guide portions respectively reciprocably supported one in each of said cylindrical guide surfaces, said valve element including a valve portion disposed in opposed relation to said valve seat and including a stem reciprocably received in said bore and terminating in said inlet chamber, baising means in said inlet chamber operatively engaging the terminal end of said stem and normally urging said valve portion off said seat, a lever intermediately pivoted in said first intermediate chamber in offset relation with respect to the path of travel of said valve element and including arm portions operatively connected between said valve element, and said first flexible partition,
   said body including a second intermediate chamber underlying an outlet chamber, said second flexible partition defining a lateral wall portion of said outlet chamber,
   passage means connecting said first and second intermediate chambers,
   a partition interposed between said second intermediate and outlet chambers and including a passage portion connecting said last mentioned chambers and having a valve seat surrounding one end thereof in said second intermediate chamber,
   an orificed plug between said first and second intermediate chambers and downstream of said passage means and having a calibrated orifice surrounded by a seal at one end engageable on said last mentioned seat, adjustable biasing means in said second intermediate chamber urging said orificed plug seal toward said seat,
   a force transmitting element reciprocably supported in said passage portion and having means permitting communication between said second intermediate and outlet chambers, one end of said force transmitting element engaging said orifice plug, a cylindrical guide surface in said outlet chamber, a second valve seat surrounding said passage between the second intermediate and outlet chambers,
   a second valve element reciprocably supported in said outlet chamber and having a triangular guide surface received in said cylindrical guide surface, said second valve element including a valve portion opposite said triangular guide surface and engaging the other end of said force transmitting element in said outlet chamber, a lever intermediately pivoted in said outlet chamber in offset relation with respect to the path of travel of said second valve element and including arm portions operatively connected between said second valve element and said second flexible partition, and means communicating with said outlet chamber for receiving fluid therefrom.

2. A pressure reducing valve as claimed in claim 1 in which said high pressure inlet means includes a tubular stem therein and having a terminal flange, a clamp nut circumposed about said stem and limited in movement by said flange, a seal element circumposed said stem in juxtaposed relation on said flange in opposing relation to said clamp nut.

3. A pressure reducing valve as claimed in claim 1 in which said high pressure inlet means includes a first bore in said body spaced from said inlet chamber, an orifice in said body communicating with said inlet chamber and an intermediate portion of said first bore, a second bore intersecting said first mentioned bore in spaced relation from said orifice, valve means displaceably supported in said second bore, and control means displaceably supported in said first bore and including means operatively connected to said valve means for controlling communication between said second bore and said orifice.

4. A pressure reducing valve as claimed in claim 3 in which said valve means in said second bore includes an elongated, spring-biased, force transmitting stem, said stem having passage means for communicating with a high pressure fluid source, a ball element disposed on one end portion of said stem, said control means comprising a slide valve reciprocably supported in said first bore and having a control land sealed with respect to the interior of said first bore, said slide valve having a recess in which a portion of said ball element is received, said slide valve including a cam portion engaged with said ball element whereby axial movement of said slide valve in one direction in said first bore depresses said ball element and permits high pressure fluid to enter the inlet chamber and opposite movement of said slide valve causes said control land to overlie said orifice.

5. A pressure reducing valve as claimed in claim 4 in which said control means comprises a manually engageable knob at one end of said slide valve and disposed exteriorly of said body.

6. A pressure reducing valve as claimed in claim 4 in which said control means comprises a flexible cable connected to said slide valve and extending out of said body.

7. A pressure reducing valve as claimed in claim 4 in which said slide valve includes a terminal land having passage means for permitting fluid pressure to be disposed on opposite sides thereof in said first bore for balancing pressures on said slide valve.

8. A pressure reducing valve as claimed in claim 1 in which said biasing means in said inlet chamber includes means for adjusting the residual pressure on said stem.

9. A pressure reducing valve as claimed in claim 1 in which said high pressure inlet means includes a cylindrical bore in said body spaced from said inlet chamber, a first passageway in said body communicating said inlet chamber to one end portion of said cylindrical bore, a second passageway intersecting at an intermediate portion said cylindrical bore in spaced relation to said first passageway, said cylindrical bore including a pair of facing valve seats formed therein, one disposed between said first and second passageways and the other on the other side of said second passageway, compound valve means in said cylindrical bore comprising a pair of axially opposed valve elements and biasing means urging said valve elements apart, and control means for operating said one valve element coacting with the valve seat positioned between the first and second passageways to permit high pressure fluid to flow into the inlet chamber from a high fluid pressure source.

10. A pressure reducing valve as claimed in claim 9 characterized in said control in laws comprising a manually operated lever exteriorly of said body, said lever including a camming portion operatively connected to said associated one valve element.

11. A pressure reducing valve as claimed in claim 10 in which said cylindrical bore includes a tubular inlet formed at the other end portion thereof outwardly of the other valve element and associated seat whereby said other valve element can be displaced off its associated valve seat.

12. A pressure reducing valve as claimed in claim 1 characterized by means disposed in said expansion chamber and engageable with an adjacent face of said second flexible partition for controlling the lateral displacement thereof when said outlet chamber is subjected to pressure.

References Cited

UNITED STATES PATENTS

| | | | |
|---|---|---|---|
| 1,200,859 | 10/1916 | Lowe | 137—505.46 |
| 2,635,392 | 4/1953 | Gratzmuller | 137—505.12 X |
| 2,895,640 | 7/1959 | Becker | 137—495 X |
| 3,032,054 | 5/1962 | Irwin | 137—505.46 X |
| 3,189,045 | 6/1965 | McCloud | 137—613 XR |

FOREIGN PATENTS

| | | |
|---|---|---|
| 499,141 | 11/1950 | Belgium. |
| 1,099,536 | 3/1955 | France. |
| 600,899 | 12/1959 | Italy. |

WILLIAM F. O'DEA, *Primary Examiner.*

HAROLD W. WEAKLEY, *Assistant Examiner.*